United States Patent

Akiyama et al.

[11] Patent Number: 6,045,883
[45] Date of Patent: Apr. 4, 2000

[54] RESIN COMPOSITION AND RESIN COMPOSITION FOR SECONDARY BATTERY JAR

[75] Inventors: Yoshikuni Akiyama; Osamu Shoji, both of Sodegaura; Yuji Kusumi, Kanagawa, all of Japan

[73] Assignee: Asahi Kasei Kogyo Kabushiki Kaisha, Osaka, Japan

[21] Appl. No.: 08/973,766

[22] PCT Filed: Jun. 28, 1996

[86] PCT No.: PCT/JP96/01794

§ 371 Date: Dec. 8, 1997

§ 102(e) Date: Dec. 8, 1997

[87] PCT Pub. No.: WO97/01600

PCT Pub. Date: Jan. 16, 1997

[30] Foreign Application Priority Data

Jun. 29, 1995 [JP] Japan .................................. 7-184985

[51] Int. Cl.[7] .............................. H01M 2/02; B29D 22/00; B65D 85/88; C08L 23/12

[52] U.S. Cl. ...................... 428/35.7; 429/176; 525/92 D

[58] Field of Search .................................... 525/92 D, 68, 525/71; 428/35.7; 429/176

[56] References Cited

U.S. PATENT DOCUMENTS

| | | | |
|---|---|---|---|
| 4,764,559 | 8/1988 | Yamauchi et al. | 525/92 |
| 4,772,657 | 9/1988 | Akiyama et al. | 524/504 |
| 4,863,997 | 9/1989 | Shibuya et al. | 525/92 |
| 5,166,264 | 11/1992 | Lee, Jr. et al. | 525/92 |

FOREIGN PATENT DOCUMENTS

| | | |
|---|---|---|
| 2-248447 | 10/1990 | Japan . |
| 6-287367 | 10/1994 | Japan . |

*Primary Examiner*—Mark L. Warzel
*Attorney, Agent, or Firm*—Pennie & Edmonds LLP

[57] ABSTRACT

A resin composition comprising a polypropylene resin, a polyphenylene ether resin and a compatibility agent wherein dispersion particles comprising the polyphenylene ether resin (b) are dispersed in a matrix comprising the polypropylene resin (a), a minor diameter of the dispersion particles is 2 $\mu$m or less, and the ratio of major diameter/minor diameter is 1–10.

16 Claims, 3 Drawing Sheets

RESIN COMPOSITION AND RESIN COMPOSITION FOR SECONDARY BATTERY JAR

TECHNICAL FIELD

The present invention relates to resin compositions which are excellent in oil resistance, chemical resistance, heat resistance, impact resistance, heat creep resistance and water vapor transmission resistance, and in balance between stiffness and tenacity (elongation) after thermal history which make it possible to utilize them in the electric and electronic fields, automobile field and the fields of other various industrial materials. Further specifically, the present invention relates to resin compositions which are especially suitably usable as materials for containers of secondary batteries such as lithium metal battery and lithium ion battery (which are both referred to as "lithium batteries" hereinafter), nickel-hydrogen battery, lead acid storage battery, and alkaline storage battery.

BACKGROUND ART

Polypropylene resins are superior in processability, water resistance, oil resistance, acid resistance and alkali resistance, but are inferior in heat resistance, rigidity, and impact resistance. Therefore, polyphenylene ether resin is blended with polypropylene resin to form a matrix of the polypropylene resin and dispersion particles of the polyphenylene ether resin, whereby a resin composition improved in heat resistance and rigidity is produced. As prior art, for example, U.S. Pat. No. 3,361,851 discloses blending polyolefin with polyphenylene ether to improve solvent resistance and impact resistance, and U.S. Pat. No. 4,383,082 and EP-A-115712 disclose blending polyphenylene ether with polyolefin and a hydrogenated block copolymer to improve impact resistance.

Furthermore, JP-A-63-113058, JP-A-63-225642, U.S. Pat. No. 4,863,997, JP-A-3-72512, JP-A-4-183748 and JP-A-5-320471 disclose addition of a specific hydrogenated block copolymer to a resin composition comprising polyolefin resin and polyphenyl ether resin to obtain a resin composition excellent in chemical resistance and processability.

Furthermore, JP-A-4-28739 and JP-A-4-28740 disclose that resin compositions excellent in balance between impact strength and rigidity are obtained by preparing resin compositions comprising polyolefin resin, polyphenylene ether resin and a specific block copolymer by a specific process.

Similarly, JP-A-7-166026 discloses that a resin composition obtained by a specific production process is excellent in impact resistance, and JP-A-7-165998 discloses that a resin composition excellent in heat resistance, impact resistance and moldability is obtained by adding a specific hydrogenated block copolymer to a resin composition comprising polyolefin resin and polyphenylene ether resin.

The applicant discloses resin compositions excellent in compatibility, rigidity, heat resistance, and solvent resistance which comprise polyphenylene ether resin, polyolefin resin and a specific hydrogenated block copolymer in JP-A-2-225563, JP-A-3-185058, JP-A-5-70679, JP-A-5-295184, JP-A-6-9828, JP-A-6-16924, JP-A-6-57130 and JP-A-6-136202.

Moreover, as for secondary battery containers, JP-A-6-203814, JP-A-8-22811 and EP-A-0691694 disclose containers comprising polyphenylene ether resin and polystyrene resin.

As seen in the above prior art, a resin composition which is a polymer alloy resin composition comprising polypropylene resin and polyphenylene ether resin and which contains the polyphenylene ether resin as dispersion particles in a matrix of the polypropylene resin is markedly improved in heat resistance and actually is considerably higher than polypropylene resin in deflection temperature under load (DTUL) which serves as an indication of heat resistance of a short period. However, at present, in the use under such environment in which internal or external pressure or load is applied for a long period of time and in addition a high temperature continues, even if improved in heat resistance indicated by deflection temperature under load (DTUL or HDT), endurance and heat resistance over a long period of time do not utterly come up with the deflection temperature under load in practical use.

Heat creep resistance is important as an indication of heat resistance under application of internal and external pressures or load over a long period of time. In the above prior art, improvement of deflection temperature under load which is heat resistance for a short time is disclosed, but they make neither mention nor suggestion of improvement of heat creep resistance.

The resin compositions of the above prior art are low in rigidity due to the effects of hydrogenated block copolymers or other elastomers used. In order to solve the problem, highly crystalline polypropylene resins are recently often used as the polypropylene resin which constitutes the matrix.

Polymer alloys of polypropylene resin-polyphenylene ether resin in which the highly crystalline polypropylene resins are used are high in heat resistance (DTUL) and superior in rigidity and heat resistance, but have practical defects such as conspicuous reduction of tenacity after thermal history, particularly, elongation and inferiority in long-term endurance as heat resistant materials.

DISCLOSURE OF INVENTION

Under the circumstances, as to resin compositions having a structure in which dispersion particles of polyphenylene ether resin are dispersed in a matrix of polypropylene resin, the inventors have conducted intensive research on diameter of the dispersion particles of polyphenylene ether resin and heat creep resistance of the compositions and, furthermore, on the balance between rigidity and tenacity after thermal history. As a result, it has been found that when dispersion particles comprising polyphenylene ether resin are controlled to a specific diameter and a specific dispersion state, a resin composition having a markedly improved heat creep resistance and excellent in heat resistance (DTUL), oil resistance and chemical resistance can be obtained and furthermore when the polypropylene resin which constitutes the matrix of the resin composition is composed of specific two polypropylene resins having different crystallinity, a resin composition excellent in tenacity (elongation) after thermal history can be obtained. Thus, the present invention has been accomplished.

The inventors have further found that a resin composition of the present invention comprising a matrix of polypropylene resin which contains dispersion particles comprising polyphenylene ether resin controlled to a specific diameter and to a specific dispersion state is unexpectedly excellent also in heat creep resistance, water vapor transmission resistance, heat resistance (DTUL), solvent resistance, acid resistance and alkali resistance and can be utilized as containers for secondary batteries. Thus, the present invention has been accomplished.

That is, the present invention relates to a resin composition comprising a polypropylene resin, a polyphenylene ether resin and a compatibility agent wherein dispersion particles comprising polyphenylene ether resin (b) are dispersed in a matrix comprising polypropylene resin (a), a minor diameter of the dispersion particles is 2 μm or less, and the ratio of major diameter/minor diameter is 1–10.

BEST MODE FOR CARRYING OUT THE INVENTION

Figure 1:
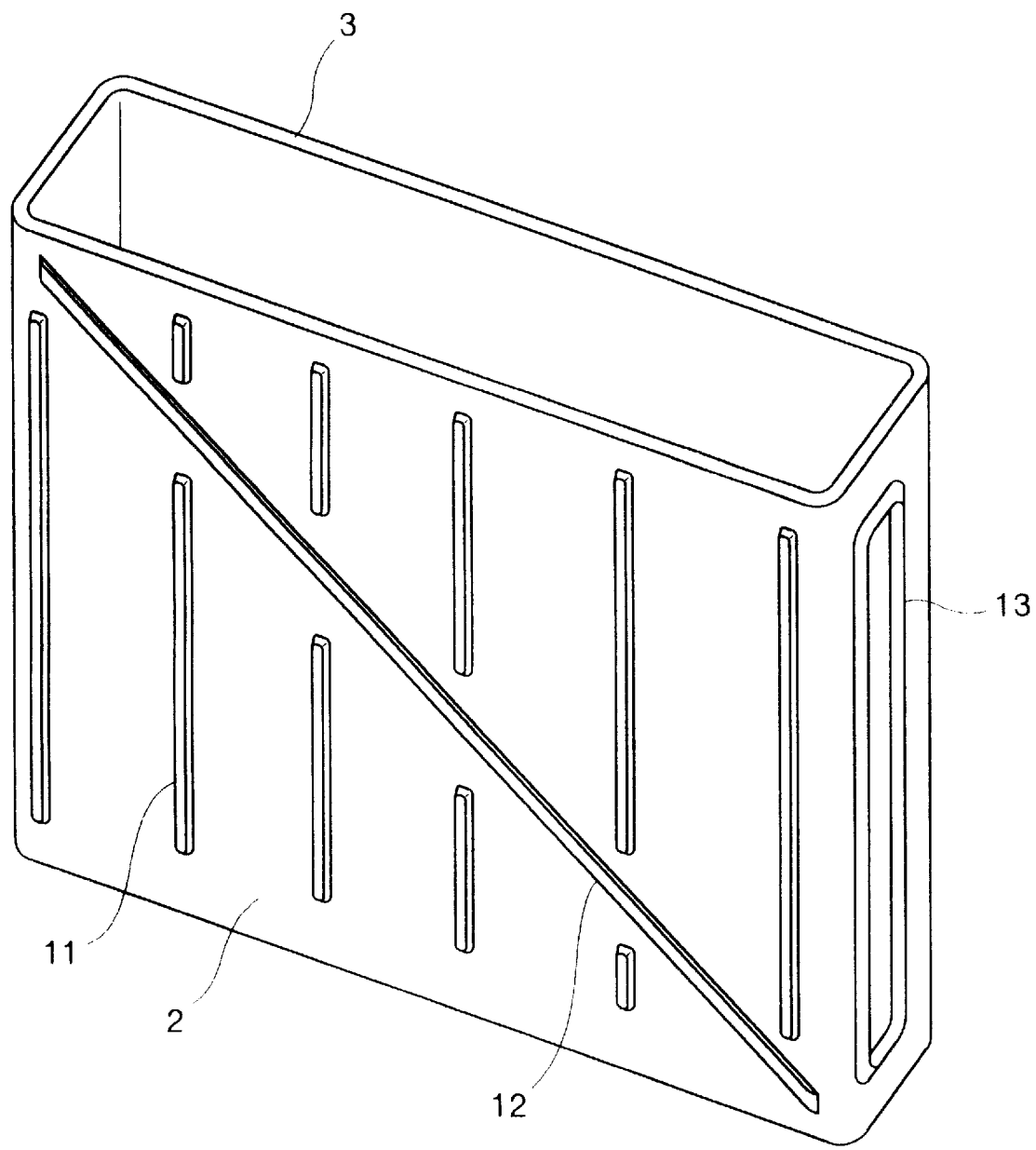
FIG. 1 is an oblique view of a container (battery case) in which a separator (electrode group) and an electrolyte of secondary battery are contained and which is a use of the resin composition of the present invention.

It is a very difficult task to micro-disperse polyphenylene ether in a matrix of polypropylene resin, and this has not been attained by the prior art. For example, according to U.S. Pat. No. 4,383,082 or U.S. Pat. No. 4,863,997, the minor diameter of dispersion particles of polyphenylene ether resin is far greater than 2 μm or even if it is smaller than 2 μm, considerably larger dispersion particles having a ratio of major diameter/minor diameter of more than 10 are formed. In the present invention, the minor diameter of dispersion particles is 2 μm or less and the ratio of major diameter/minor diameter of the dispersion particles is 1–10. When a dispersion state of particles of such shape and size is formed, particularly heat creep resistance and others are remarkably improved. More preferred properties are obtained when the dispersion particles are further smaller, namely, they have a minor diameter of 1 μm or less and the ratio of major diameter/minor diameter is 1–3, and these particles are micro-dispersed in the polypropylene resin.

For obtaining the preferred dispersion state of the present invention, it is preferred to employ a blending method and a hydrogenated block copolymer of a specific structure as explained hereinafter.

As the polypropylene resins of component (a) which form a matrix of the resin composition of the present invention, mention may be made of crystalline propylene homopolymers and crystalline propylene-ethylene block copolymers which have a crystalline propylene homopolymer portion obtained at the first step of polymerization and a propylene-ethylene random copolymer portion obtained by copolymerizing propylene, ethylene and/or at least one other α-olefin (e.g., butene-1, hexene-1, etc.) at the second and subsequent steps of polymerization. Furthermore, they may be mixtures of said crystalline propylene homopolymer and crystalline propylene-ethylene block copolymer.

These polypropylene resins are usually obtained by carrying out polymerization at a polymerization temperature of 0–100° C. under a polymerization pressure of 3–100 atm in the presence of a titanium trichloride catalyst or a titanium halide catalyst supported on a carrier such as magnesium chloride and an alkylaluminum compound. In this case, a chain transfer agent such as hydrogen may be added to adjust the molecular weight of the polymer. Furthermore, either of batch type or continuous type polymerization process may be employed. There may be applied a solution polymerization in the presence of a solvent such as butane, pentane, hexane, heptane or octane, a slurry polymerization, a bulk polymerization in monomers in the absence of solvent, a gas phase polymerization in gaseous monomers, and the like.

Moreover, as a third component in addition to the above polymerization catalysts, an electron donating compound can be used as an internal or external donor component. The electron donating compound may be known one, and examples of the compound are ester compounds such as ε-caprolactone, methyl methacrylate, ethyl benzoate and methyl toluylate, phosphite esters such as triphenyl phosphite and tributyl phosphite, phosphoric acid derivatives such as hexamethylphosphoric triamide, alkoxy ester compounds, aromatic monocarboxylic acid esters and/or aromatic alkylalkoxysilanes, aliphatic hydrocarbon alkoxysilanes, various ether compounds, various alcohols and/or various phenols.

The polypropylene resins having any crystallinity and melting point can be used each alone as far as they are obtained by the above processes, but when the resulting resin compositions are required to exhibit endurance against thermal history as heat resistant materials, it is preferred to use a polypropylene resin comprising two polypropylene resins having different properties which are mixed at a specific ratio.

That is, in the present invention there may be preferably used a polypropylene resin comprising at a specific ratio, as component (a-1), a high-crystalline polypropylene resin in which the proportion of a crystalline phase comprising a propylene homopolymer portion is 96% or more obtained from free induction damping (FID) by pulse NMR and which has a melting point of 163° C. or higher and, as component (a-2), a medium-crystalline polypropylene resin in which the proportion of a crystalline phase comprising a propylene homopolymer portion is 93% or more and less than 96% obtained from free induction damping (FID) by pulse NMR and which has a melting point of 155° C. or higher and lower than 163° C. Hereinafter, the component (a-1) will be referred to as high-crystalline polypropylene and the component (a-2) will be referred to as medium-crystalline polypropylene, and a blend of them will be referred to as polypropylene resin.

The proportion of crystalline phase of the propylene homopolymer portion in the present invention can be obtained by known pulse NMR method from free induction damping (FID) which is a magnetization change after application of 90° pulse based on spin-spin relaxation, with utilization of different motions of the crystalline portion and non-crystalline portion. Specifically, polypropylene in solid state is subjected to measurement using pulse NMR (PC-120 manufactured by Bruker Co., Ltd.) at a temperature of 40° C., a proton resonance frequency of 20 MHz and a pulse time of 4μ second with integration of three times. Peaks having a sorter relaxation time and a less shorter relaxation time are identified to be crystalline phase and non-crystalline phase, respectively, by solid echo technique, and the crystalline phase is regressed by Gauss curve and the non-crystalline phase is regressed by Lorentz curve. Height of each peak is expressed by SA1 and SA2, and the proportion of the crystalline phase can be obtained from the formula $R_{12} = \{100 \times (SA1-SA2) \times F\} \div \{(SA1-SA2) \times F + SA2\}$. In this formula, R12 is the proportion of the crystalline phase of propylene homopolymer portion and F is fudge factor obtained from intensity ratio in the case of using salad oil and polymethyl methacrylate as standard samples.

A resin composition containing polypropylene having a proportion of the crystalline phase of less than 93% is excellent in tenacity (elongation) after thermal history, but tends to decrease in rigidity and heat resistance (DTUL). A resin composition containing polypropylene having a proportion of the crystalline phase of more than 96% is high in rigidity and heat resistance (DTUL), but tends to decrease in tenacity (elongation) after thermal history.

Melting point of the crystalline phase of the propylene homopolymer portion in the present invention is a value of melting point measured by a differential scanning calorimeter (DSC-2 manufactured by Parkin Elmer Co., Ltd.) at a heating rate of 20° C./min and a cooling rate of 20° C./min. In more detail, when about 5 mg of a sample is kept at 20° C. for 2 minutes, then heated to 230° C. at a rate of 20° C./min, kept at 230° C. for 2 minutes, then cooled to 20° C. at a rate of 20° C./min, kept at 20° C. for 2 minutes, and then heated at a rate of 20° C./min, the temperature of top peak of the resulting endothermic peaks is taken as the melting point.

A resin composition obtained from polypropylene of lower than 155° C. in this melting point is excellent in tenacity (elongation) after thermal history, but tends to decrease in rigidity and heat resistance (DTUL). A resin composition obtained from polypropylene of higher than 163° C. in this melting point is excellent in rigidity after thermal history and heat resistance (DTUL), but tends to decrease in tenacity (elongation) after thermal history.

The polypropylene resins used in the present invention can be usually selected from those having a melt flow rate of 0.1–100 g/10 min (measured in accordance with ASTM D1238 at 230° C. under a load of 2.16 Kg), but are preferably those having a melt flow rate of 0.1–2 g/10 min for the development of sufficient heat creep resistance.

The polypropylene resins used in the present invention may also be known modified polypropylene resins obtained by reacting the said polypropylene resins with α,β-unsaturated carboxylic acids or derivatives thereof in the presence or absence of radical generators in molten state or in solution state at 30–350° C. In this case, it is preferred that the α,β-unsaturated carboxylic acids or derivatives thereof in an amount of 0.01–10% by weight are grafted or added to the polypropylene. Furthermore, the polypropylene resins may be mixtures of the said polypropylene resins and the modified polypropylene resins at an optional ratio.

When a high-crystalline polypropylene and a medium-crystalline polypropylene are used in combination as the polypropylene resin of component (a), the weight ratio of high-crystalline polypropylene/medium-crystalline polypropylene is 95/5–10/90, preferably 90/10–70/30, more preferably 90/10–50/50. If the proportion of the high-crystalline polypropylene exceeds 95%, the resulting resin composition is excellent in heat resistance (DTUL) and rigidity, but tends to decrease in tenacity (elongation) after exposed to thermal history (80° C.×48 hours). If the proportion of the medium-crystalline polypropylene exceeds 90%, the resulting resin composition is not conspicuous in decrease of tenacity (elongation) after exposed to thermal history (80° C.×48 hours), but tends to decrease in heat resistance (DTUL) and rigidity.

The polyphenylene ether resin (hereinafter referred to as "PPE") as component (b) which forms dispersion particles in the resin composition of the present invention is a component essential for imparting heat resistance (DTUL), heat creep resistance and flame retardance to the resin composition of the present invention.

The PPE is a homopolymer and/or a copolymer comprising a recurring unit of the following formula:

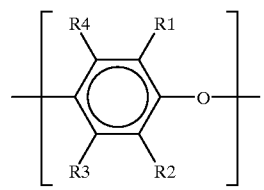

known PPE obtained by reacting the said PPE with styrene monomers and/or α,β-unsaturated carboxylic acids or derivatives thereof (e.g., ester compounds and acid anhydride compounds) in the presence or absence of radical generators in molten state, in solution state or in slurry state at 80–350° C. In this case, it is preferred that the styrene monomers and/or α,β-unsaturated carboxylic acids or derivatives thereof in an amount of 0.01–10% by weight are grafted or added to the PPE. Furthermore, the PPE may be mixtures of the said PPE and the modified PPE at an optional ratio.

Moreover, phosphorus compound-treated PPE obtained by adding 0.2–5 parts by weight of 9,10-dihydro-9-oxa-10-phosphaphenanthrene to 100 parts by weight of PPE and melt kneading the mixture can also be used as PPE superior in color tone and flowabiliy.

In addition to the above PPE, those which comprise 100 parts by weight of PPE and not more than 500 parts by weight, preferably 200 parts by weight or less of polystyrene, high-impact polystyrene, syndiotactic polystyrene and/or rubber-reinforced syndiotactic polystyrene can also be suitably used as PPE used in the present invention.

The resin composition of the present invention has such a structure that dispersion particles comprising the polyphenylene ether resin (b) are dispersed in a matrix comprising the polypropylene resin (a), the minor diameter of said dispersion particles being 2 μm or less (wherein $R_1$, $R_2$, $R_3$ and $R_4$ may be the same or different and are selected from the group consisting of hydrogen, halogen, lower alkyl group of 1–7 carbon atoms, phenyl group, haloalkyl group, aminoalkyl group, hydrocarbon oxy group and halohydrocarbon oxy group in which at least two carbon atoms separate halogen atom from oxygen atom) and having a reduced viscosity (0.5 g/dl, chloroform solution, measuring temperature 30° C.) of 0.15–0.70, more preferably 0.20–0.60.

Examples of PPE are poly(2,6-dimethyl-1,4-phenylene ether), poly(2-methyl-6-ethyl-1,4-phenylene ether), poly(2-methyl-6-phenyl-1,4-phenylene ether), and poly(2,6-dichloro-1,4-phenylene ether). Further examples are polyphenylene ether copolymers such as copolymers of 2,6-dimethylphenol and other phenols (e.g., 2,3,6-trimethylphenol and 2-methyl-6-butylphenol). Preferred are poly(2,6-dimethyl-1,4-phenylene ether) and copolymer of 2,6-dimethylphenol and 2,3,6-trimethylphenol, and poly(2,6-dimethyl-1,4-phenylene ether) is more preferred.

Process for producing PPE is not limited. For example, PPE can be easily produced by oxidative polymerization of 2,6-xylenol using a complex of a cuprous salt and an amine as a catalyst in accordance with Hay process described in U.S. Pat. No. 3,306,874. In addition, it can be easily produced by the processes described in U.S. Pat. No. 3,306,875, U.S. Pat. No. 3,257,357, U.S. Pat. No. 3,257,358, JP-B-52-17880, JP-A-50-51197, JP-A-63-152628, etc.

The PPE in the present invention may also be and the ratio of major diameter/minor diameter being in the range of 1–10, preferably, the minor diameter being 1 μm or less and the ratio of major diameter/minor diameter being in the range of 1–3.

In order to obtain the resin composition in which dispersion particles having a specific particle size are dispersed, a compatibility agent is an essential component in addition to the polypropylene resin (a) and the polyphenylene ether resin (b). The compatibiliz-ing agent may be any one which has an ability to disperse the polyphenylene ether resin (b) with the above-mentioned specific particle size in a matrix of the polypropylene resin (a), and its chemical structure is not restricted. The blending ratio of the polypropylene resin (a), the polyphenylene ether resin (b) and the compatibility agent in the resin composition is also not restricted, and process for the preparation of the composition is also not restricted.

As the compatibility agent, mention may be made of, for example, block (graft) copolymers obtained by chemical bonding of polypropylene molecular chain to polyphenylene ether molecular chain, block (graft) copolymers obtained by chemical bonding of polypropylene molecular chain to polystyrene molecular chain, block (graft) copolymers obtained by chemical bonding of molecular chain of an ethylene-α-olefin copolymer elastomer to polyphenylene ether molecular chain, block (graft) copolymers obtained by chemical bonding of molecular chain of an ethylene-α-olefin copolymer elastomer to polystyrene molecular chain, and hydrogenated block copolymers.

Of these compatibility agents, the hydrogenated block copolymers (c) are specifically more preferred.

The hydrogenated block copolymers act as dispersing agents to disperse the particles of the polyphenylene ether resin in the matrix of the polypropylene resin and further impart impact resistance to the resin composition.

The hydrogenated block copolymer is obtained by hydrogenating at least 80% of a block copolymer comprising at least one polymer block B mainly composed of a conjugated diene compound having 30–95%, preferably 30–80% of vinyl bond (i.e., total amount of 1,2-vinyl bond and 3,4-vinyl bond) and at least one polymer block A mainly composed of a vinyl aromatic compound.

This hydrogenated block copolymer is a hydrogenation product of a vinyl aromatic compound-conjugated diene compound block copolymer having a structure of bonded block units such as A-B, A-B-A, B-A-B-A, (A-B-)$_n$-X (wherein n is an integer of 1 or more and X is a reaction residue of polyfunctional coupling agents such as silicon tetrachloride and tin tetrachloride or a residue of initiators such as polyfunctional organolithium compounds) and A-B-A-B-A types, and a vinyl aromatic compound bonded in the block copolymer is contained in an amount of 27–80% by weight, preferably 33–80% by weight, more preferably 45–70% by weight. The hydrogenated block copolymer has a Young's modulus of 250–7000 Kg/cm$^2$, which depends on the amount of the bonded vinyl aromatic compound.

Referring to the block structure, the polymer block B mainly composed of a conjugated diene compound has a homopolymer block of a conjugated diene compound or a copolymer block of a vinyl aromatic compound and more than 50% by weight, preferably at least 70% by weight of a conjugated diene compound. The polymer block A mainly composed of a vinyl aromatic compound has a homopolymer block of a vinyl aromatic compound or a copolymer block of a conjugated diene compound and more than 50% by weight, preferably at least 70% by weight of a vinyl aromatic compound.

Furthermore, distribution of the vinyl aromatic compound unit or conjugated diene compound unit in the molecular chain in each of these polymer block B and polymer block A may be random, tapered (i.e., the monomer component increases or decreases along the molecular chain), partially blocked or in combination of these distribution states. When two or more of polymer blocks B and two or more of polymer blocks A are present, the respective polymer blocks may be of the same structure or different structure.

With reference to the polymer block B of the hydrogenated block copolymer used in the present invention, at least one polymer block B may be mainly composed of a conjugated diene compound having a single vinyl bond content selected from the range of 30–95%, preferably 30–80% in the block copolymer before hydrogenation, or both of at least one polymer block B mainly composed of a conjugated diene compound having a vinyl bond content selected from the range of 30–55% and at least one polymer block B mainly composed of a conjugated diene compound having a vinyl bond content selected from the range of more than 55% and 95% or less, preferably more than 55% and 80% or less may be contained in the block copolymer before hydrogenation.

The conjugated diene compounds constituting the block copolymer B include, for example, one or more compounds selected from butadiene, isoprene, 1,3-pentadiene and 2,3-dimethyl-1,3-butadiene. Preferred are butadiene, isoprene and combination of them. In the polymer block B mainly composed of conjugated diene compound, the microstructure (bonding form of the conjugated diene compound) of the block has 30–95% of 1,2-vinyl bond in the case of polymer block B mainly composed of butadiene and 30–95% of 3,4-vinyl bond in the case of polymer block B mainly composed of isoprene. Furthermore, as to the vinyl bond of polymer block B obtained by copolymerizing butadiene and isoprene, a total amount of 1,2-vinyl bond and 3,4-vinyl bond is 30–95%. The bonding state of these conjugated diene compounds can usually be known by infrared spectrum, NMR spectrum or the like.

The vinyl aromatic compounds constituting the polymer block A include, for example, one or more compounds selected from styrene, α-methylstyrene, vinyltoluene, p-tert-butylstyrene and diphenylethylene. Among them, styrene is preferred.

Number-average molecular weight of the block copolymer having the above structure is in the range of 5,000–1,000,000, and molecular weight distribution [ratio of weight-average molecular weight (Mw) and number-average molecular weight (Mn) measured by gel permeation chromatography] is 10 or less, and in order to exhibit heat creep resistance which is an effect of the resin composition of the present invention, the number-average molecular weight of the polymer block A mainly composed of the vinyl aromatic compound is 15,000 or more, more preferably 20,000 or more. The molecular structure of this block copolymer may be any of straight chain, branched chain, radial or optional combination thereof.

The block copolymer having such structure is made to a hydrogenated block copolymer, namely, a hydrogenation product of vinyl aromatic compound-conjugated diene compound block copolymer by hydrogenating the aliphatic double bond of the polymer block B contained in the block copolymer, and this is used as component (c) of the present invention. Hydrogenation rate of the aliphatic double bond is 80% or higher. This hydrogenation rate can be generally known by infrared spectrometry, NMR spectrum or the like.

The hydrogenated block copolymer of the component (c) of the present invention has the above-mentioned structure of hydrogenated block copolymer. In production of the resin composition of the present invention, the hydrogenated block copolymer may be one obtained by hydrogenating a block copolymer which comprises at least one polymer block B mainly composed of a conjugated diene compound having 30–55% of vinyl bond content before hydrogenation and at least one polymer block A mainly composed of a vinyl aromatic compound, or it may be one obtained by hydrogenating a block copolymer which comprises at least one polymer block B mainly composed of a conjugated diene compound having more than 55% and 95% or less, preferably more than 55% and 80% or less of vinyl bond content before hydrogenation and at least one polymer block A mainly composed of a vinyl aromatic compound. The hydrogenated block copolymers classified into two by the different vinyl bond contents of the conjugated diene compound before hydrogenation respectively further include one obtained by hydrogenating a block copolymer which comprises at least one polymer block B' mainly composed of a conjugated diene compound having 5% or more and less than 30% of vinyl bond content before hydrogenation in addition to the polymer block B, the ratio of these polymer blocks of B/B' being 99/1–50/50 (by weight) and at least one polymer block A mainly composed of a vinyl aromatic compound.

This hydrogenated block copolymer is a hydrogenation product of a vinyl aromatic compound-conjugated diene compound block copolymer having a structure of bonded block units such as B'-B-A, B'-A-B-A, B'-A-B-A-B, (B'-A-B-)$_n$-X (wherein n is an integer of 1 or more and X is a reaction residue of polyfunctional coupling agents such as silicon tetrachloride and tin tetrachloride or a residue of initiators such as polyfunctional organolithium compounds), and the hydrogenated block copolymers having these structures belong to either one of the two classified by the vinyl bond content in the conjugated diene compound of the main polymer block B.

Number-average molecular weight of the polymer block B or B' in the above-mentioned hydrogenated block copolymer is 1000 or more, preferably 5000 or more.

The above-mentioned hydrogenated block copolymer of the component (c) may be produced by any processes as far as the the resulting copolymer has the above structure. Examples of the known processes for the production of it include those described in JP-A-47-11486, JP-A-49-66743, JP-A-50-75651, JP-A-54-126255, JP-A-56-10542, JP-A-56-62847, JP-A-56-100840, GB-A-1130770, U.S. Pat. No. 3,281,383 and U.S. Pat. No. 3,639,517, and furthermore those described in GB-A-1020720, U.S. Pat. No. 3,333,024 and U.S. Pat. No. 4,501,857.

Moreover, the hydrogenated block copolymer of the component (c) used in the present invention may also be a modified hydrogenated block copolymer otained by reacting said hydrogenated block copolymer with an α,β-unsaturated carboxylic acid or a derivative thereof (e.g., ester compound or acid anhydride compound) in the presence or absence of a radical generator in molten state, in solution state or in slurry state at 80–350° C. In this case, it is preferred that the α,β-unsaturated carboxylic acid or derivative thereof in an amount of 0.01–10% by weight is grafted or added to the hydrogenated block copolymer. Furthermore, it may be a mixture of said hydrogenated block copolymer and the modified hydrogenated block copolymer at an optional ratio.

One preferred embodiment of the resin compositions of the present invention comprises polypropylene resin (a) as a matrix phase and dispersion particles comprising polyphenylene ether resin (b) and hydrogenated block copolymer (c) as a disperse phase, the minor diameter of said dispersion particles being 2 μm or less, preferably 1 μm or less, the ratio of major diameter/minor diameter being 1–10, preferably 1–3.

The above resin composition is excellent in heat creep resistance, water vapor transmission resistance and heat resistance (DTUL). As for morphology of the dispersion particles comprising the polyphenylene ether resin as the disperse phase, when the minor diameter exceeds 2 μm or even if it is 2 μm or less, when the ratio of major diameter/minor diameter exceeds 10, heat creep resistance and water vapor transmission resistance are considerably deteriorated, although the heat resistance (DTUL) is maintained to some extent.

Diameter of the dispersion particles comprising polyphenylene ether resin (b) and hydrogentated block copolymer (c) can be easily measured by a transmission electron microscope. The dispersion particles generally mean those of [major diameter/minor diameter]≧1, and specifically, when [major diameter/minor diameter]=1, namely, major diameter=minor diameter, they are circular dispersion particles and when [major diameter/minor diameter]>1, they are dispersion particles of fibril structure or lamellar structure, and the dispersion particles comprise one or two or more kinds of these dispersion particles.

In these dispersion particles, most of the hydrogenated block copolymer is present in the shell of dispersion particles comprising the polyphenylene ether resin or is included inside the dispersion particles comprising the polyphenylene ether resin, but it may be present singly separate from the dispersion particles in the matrix of polypropylene resin to such an extent as not damaging heat resistance (DTUL), heat creep resistance and water vapor transmission resistance which are effects of the present invention. Furthermore, the dispersion particles of polyphenylene ether resin may contain therein a vinyl aromatic compound-conjugated diene compound block copolymer, crosslinked particles of elastomer contained in high-impact polystyrene, an inorganic filler and the like as other components. The dispersion state can be easily confirmed and determined by a transmission electron microscope. For example, a sample is subjected to oxidation dying using a heavy metal compound such as ruthenium tetrachloride, an ultra-thin slice is cut out by an ultra-microtome, the slice is observed by a transmission electron microscope and photographed, and developed to obtain a photograph (e.g., ×10,000), and the minor diameter and major diameter of individual dispersion particle and additional average values thereof are obtained. Thus, the minor diameter of 2 μm or less and the major diameter/minor diameter=1–10 can be confirmed.

The resin composition of the present invention as one preferred embodiment comprises 37–94% by weight of the polypropylene resin as component (a), 4–54% by weight of the polyphenylene ether resin as component (b) and 1–20% by weight of the hydrogenated block copolymer as component (c). The resin composition of the present invention as more preferred embodiment comprises 48–71% by weight of the polypropylene resin as component (a), 24–39% by weight of the polyphenylene ether resin as component (b) and 5–13% by weight of the hydrogenated block copolymer as component (c), said polypropylene resin containing a high-crystalline polypropylene resin and a medium polypropylene resin at a ratio of 2/1–1/2 (weight ratio), melt flow rate of said polypropylene resin comprising the combination of these polypropylene resins being 0.5–8 (g/10 min), more preferably 0.5–2.0 (g/10 min).

Process for the production of the resin composition of the present invention will be explained below.

For obtaining the resin composition of the present invention, selection of the polypropylene resin, polyphenylene ether resin and hydrogenated block copolymer capable of serving as a compatibility agent, selection of amounts of the respective components, and selection of mixing method of the components (for example, melt kneading method, blending of solutions using solvents, etc.) are naturally important. However, an important key technology to markedly improve heat creep resistance and water vapor transmission resistance is that the polyphenylene ether resin and hydrogenated block copolymer which mainly constitute the dispersion particles show the above-mentioned specific micro-dispersion structure, and any production processes may be employed as far as resin compositions having such micro-dispersion structure are obtained.

The most preferred embodiment as a process for industrially easily obtaining the dispersion state of the resin composition of the present invention is as follows:

① The melt kneader used for melt kneading the respective components is a multi-screw extruder in which kneading blocks can be incorporated into optional positions of a screw, and all kneading block parts of the screw used are incorporated substantially at $L/D \geq 1.5$, more preferably $L/D \geq 5$ (where L indicates a total length of the kneading blocks and D indicates the maximum outer diameter of the kneading blocks), and $\pi \cdot D \cdot N/h \geq 50$ is satisfied (where $\pi=3.14$, D=outer diameter of screw corresponding to metering zone, N=screw revolution speed (the number of revolution/sec), and h=depth of channel of metering zone).

② The extruder is provided with a first raw material feed opening on the upstream side and a second raw material feed opening on the downstream side in respect to the flow direction of the raw material, and if necessary, one or more raw material openings may be additionally provided downstream the second raw material feed opening, and furthermore, if necessary, vacuum vent holes may be provided between these raw material feed openings.

Feeding method of raw materials which is the basis in the process for producing the resin composition of the present invention comprises feeding from the first raw material feed opening the whole of the polyphenylene ether resin of component (b) or the whole of the polyphenylene ether resin of component (b) and a part of the polypropylene resin of component (a) in an amount of not more than 50% of the whole amount of the polypropylene resin of component (a) together and feeding from the second raw material feed opening the whole amount of the polypropylene resin of component (a) or the remainder of the polypropylene resin of component (a) after fed from the first raw material feed opening. Usually, the melt kneading is carried out under the conditions of a barrel temperature of the extruder of 200–370° C., preferably 250–310° C. and a screw revolution speed of 100–1200 rpm, preferably 200–500 rpm.

③ As for the feeding method of the hydrogenated block copolymer (classified into aforementioned two kinds depending on the content of vinyl bond before hydrogenation) which is a compatibility agent, different methods must be selected depending on the content of vinyl bond. That is, in order to attain the feature of the resin composition of the present invention, namely, having a structure where dispersion particles comprising polyphenylene ether resin (b) and hydrogenated block copolymer (c) are dispersed in a matrix comprising polypropylene resin (a), with the minor diameter of the dispersion particles being 2 μm or less and the ratio of major diameter/minor diameter being 1–10, the following feeding method is employed.

④ When a hydrogenated block copolymer (c) in which the vinyl bond content in polymer block B in the block copolymer before hydrogenation is 30–55% is used as a compatibility agent, the hydrogenated block copolymer (c) is fed divisionally from the first raw material feed opening and the second raw material feed opening at a ratio of [feed amount from the first raw material feed opening]/[feed amount from the second raw material feed opening] of 90/10–30/70 (by weight), preferably 70/30–30/70 (by weight).

Furthermore, when the hydrogenated block copolymer (c) is divided and fed from the first raw material feed opening and the second raw material feed opening as mentioned above, the dispersion particles comprising polyphenylene ether resin (b) and hydrogenated block copolymer (c) in the resulting resin composition have a minor diameter of 2 μm or less and a ratio of major diameter/minor diameter of 1–10, and, furthermore, fine single micells of the hydrogenated block copolymer (c) decrease and a resin composition excellent in heat creap resistance and water vapor transmission resistance is obtained.

⑤ When hydrogenated block copolymer (c) in which the vinyl bond content in polymer block B in the block copolymer before hydrogenation is more than 55% and 95% or less is used as a compatibility agent, the whole of the hydrogenated block copolymer (c) is fed from the first raw material feed opening.

When the whole of the hydrogenated block copolymer (c) is fed from the first raw material feed opening together, the dispersion particles of polyphenylene ether resin (b) in the resulting resin composition have a minor diameter of 2 μm or less and a ratio of major diameter/minor diameter of 1–10, and, furthermore, fine single micells of the hydrogenated block copolymer (c) decrease and a resin composition excellent in heat creap resistance and water vapor transmission resistance is obtained.

⑥ When a hydrogenated block copolymer (c) in which the vinyl bond content in polymer block B in the block copolymer before hydrogenation is more than 55% and 95% or less and which additionally has a polymer block B having a vinyl bond content outside the above range (having a vinyl bond content of 30–55%) or a polymer block B' (having a vinyl bond content of 5% or more and less than 30%) is used as a compatibility agent, the whole of the hydrogenated block copolymer (c) is fed from the first raw material feed opening.

By employing these processes, the dispersion particles of polyphenylene ether resin (b) in the resulting resin composition have a minor diameter of 2 μm or less and a ratio of major diameter/minor diameter of 1–10, and, furthermore, fine single micells of the hydrogenated block copolymer (c) decrease and a resin composition excellent in heat creap resistance and water vapor transmission resistance is obtained.

In the process for the production of the resin composition of the present invention by melt kneading using an extruder, the most important controlling condition in the relation between control of morphology and performance of the resulting resin composition is to vary the method of feeding the hydrogenated block copolymer (described in the above ③–⑥) as a compatibility agent to the extruder depending on the vinyl bond content of conjugated diene compound of polymer block B or B' in the block copolymer before hydrogenation.

In the present invention, in addition to the above components, there may be added other additional components as far as they do not damage the features and effects of the present invention. Examples of these additional components are antioxidants, metallic inactivating agents, flame retardants (organic phosphate compounds, ammonium polyphosphate flame retardants, aromatic halogen flame retardants, silicone flame retardants, etc.), fluorine-based polymers, elastomers for imparting impact resistance (including hydrogenated block copolymers), plasticizers (low molecular weight polyethylene, epoxidized soybean oil, polyethylene glycol, fatty acid esters, etc.), flame retardant aids such as antimony trioxide, weathering resistance (light resistance) improvers, nucleating agents for polyolefins, slip agents, inorganic or organic fillers or reinforcing materials (glass fibers, carbon fibers, polyacrylonitrile fibers, whiskers, mica, talc, carbon black, titanium oxide, calcium carbonate, potassium titanate, wollastonite, electrically conductive metal fibers, electrically conductive carbon black, etc.), various colorants, and releasing agents.

The resin composition of the present invention can be molded into molded articles of sheets, films and various parts by various known methods such as compression molding, injection molding, extrusion molding, multi-layer extrusion molding, contour extrusion molding, and blow-extrusion molding. These various parts include, for example, automotive parts. Specifically, the resin composition is suitable for exterior trims such as bumper, fender, door panel, various lacing braids, emblem, engine hood, wheel cap, roof, spoiler, and various aeroparts and interior trims such as instrument panel, console box and trim. Furthermore, the resin composition can be suitably used as interior and exterior parts of electrical equipments. Specifically, it is suitable for various computers and their peripheral devices, other office automation equimpents, chassis or cabinets of television, video tape recorder, and disc player, parts of refrigerators.

Furthermore, the resin composition of the present invention is suitable as molding materials for containers of secondary batteries because it is excellent in water vapor transmission resistance in addition to heat creep resistance.

The resin composition of the present invention for containers of secondary batteries will be explained.

Recently, with development of automobiles and spread of computers and from the viewpoints of the saving of resources and the protection of environment by effective utilization of solar energy, uses for electric sources for driving transfer equipments, electric sources for data back-up, solar batteries and various secondary batteries are being increased. It is well known that secondary batteries are often used for the supply of electric power necessary for internal combustion engines, and development of so-called electric automobiles which employ directly secondary batteries as driving electric sources in place of internal combustion engines is intensively tried for the protection of earthly environment. With development of industrial techniques, demand for secondary batteries tends to increase more and more, and miniaturization and weight-saving and increase of electric capacity of secondary batteries are increasingly desired.

A container containing an electrolyte and electrodes is essential for secondary batteries. Main characteristics required for the container are (1) resistance to electrolyte and (2) long-term stability.

The resistance to electolyte includes, for example, resistance to aqueous alkali solution for alkaline storage batteries, resistance to organic electrolyte (e.g., an organic electrolyte comprising lithium hexafluorophosphate ($LiPF_6$) as a solute and propylene carbonate/1,2-dimethoxyethane as a main component of organic solvent) for lithium ion batteries, and resistance to acid for lead acid storage batteries. Furthermore, when the batteries are used for automobiles, the container is further required to have oil resistance. Moreover, it is necessary to maintain properly the properties of the electrolyte over a long period of time. For example, in the case of alkaline storage batteries, when water in the aqueous alkali solution in the container transmits through the container to the outside, performance is deteriorated, in the case of lithium ion batteries, when inversely water enters into the container from the outside, lithium salts (e.g., lithium hexafluorophosphate ($LiPF_6$) and lithium borofluoride) in the organic solvent is decomposed to cause deterioration of performance.

Moreover, performances of standing against heat generation and increase in internal pressure due to the chemical reaction at the time of charging and discharging are required over a long period of time.

Particularly, sealed secondary batteries are required to be small in size, light in weight, large in capacity and long in life as far as possible. Therefore, the container of sealed secondary batteries is required to be thin in wall thickness and to have heat resistance, heat creep resistance and hot rigidity which can stand against the severe conditions such as heat generation and increase in internal pressure at the time of charging and discharging.

Hitherto, polypropylene resin and ABS resin are mainly employed as materials of the container of secondary batteries. However, though the polypropylene resin is superior in flowability at molding, hot water transmission resistance (water vapor transmission resistance) and gas permeation resistance, it has the defects of being large in molding shrinkage and inferior in rigidity, especially rigidity at high temperatures and heat creep resistance when a product of thin-wall ribbed structure is made by injection molding. On the other hand, ABS resin is insufficient in resistance to gasoline and oil (e.g., blake oil and rust preventive) in automobile use, and, furthermore, since it is high in hot water transmission and gas permeability, properties of the electrolyte cannot be maintained in long-term use and maintenance of capacity over a long period of time which is the life of secondary batteries cannot be attained.

The resin composition of the present invention solves the problems in the conventional materials of containers for secondary batteries, and especially is improved in heat creep resistance and excellent in water vapor transmission resistance, heat resistance, acid resistance, alkali resistance and oil resistance. Thus, it can be utilized for containers of secondary batteries.

The present invention will be explained in more detail by the following examples, which are not limiting the invention.

REFERENCE EXAMPLE 1

Preparation of High-Crystalline Polypropylene as Component (a-1)

PP-1: Propylene homopolymer

Proportion of crystalline phase of propylene homopolymer portion=97.1%

Melting point=168° C., MFR=0.5

PP-2: Propylene homopolymer

Proportion of crystalline phase of propylene homopolymer portion=96.7%

Melting point=167° C., MFR=6.8

PP-3: Propylene homopolymer

Proportion of crystalline phase of propylene homopolymer portion=96.2%

Melting point=165° C., MFR=13.4

MFR (melt flow rate) of the polypropylenes was measured in accordance with ASTM D1238 at 230° C. under a load of 2.16 Kg.

REFERENCE EXAMPLE 2

Preparation of Medium-Crystalline Polypropylene as Component (a-2)

PP-4: Propylene homopolymer

Proportion of crystalline phase of propylene homopolymer portion=94.0%

Melting point=160° C., MFR=0.5

PP-5: Propylene homopolymer

Proportion of crystalline phase of propylene homopolymer portion=95.2%

Melting point=161° C., MFR=1.9

PP-6: Propylene homopolymer

Proportion of crystalline phase of propylene homopolymer portion=93.3%

Melting point=159° C., MFR=2.5

MFR of the polypropylenes was measured in accordance with ASTM D1238 at 230° C. under a load of 2.16 Kg.

REFERENCE EXAMPLE 3

Preparation of PPE as Component (b)

b-1: Polyphenylene ether having a reduced viscosity of 0.54 obtained by oxidative polymerization of 2,6-xylenol.

b-2: Polyphenylene ether having a reduced viscosity of 0.31 obtained by oxidative polymerization of 2,6-xylenol.

REFERENCE EXAMPLE 4

Preparation of Hydrogenated Block Copolymer as Component (c)

A hydrogenated block copolymer having a structure of polypropylene-hydrogenated polybutadiene-polystyrene, a bonded styrene content of 60%, a number-average molecular weight of 108,000, a molecular weight distribution of 1.08, a 1,2-vinyl bond content of polybutadiene of 35% before hydrogenation, a hydrogenation rate of polybutadiene portion of 99.9%, and a Young's modulus of 6,000 Kg/cm$^2$ was prepared, and the resulting polymer was used as (c-1).

Similarly, a hydrogenated block copolymer having a structure of polystyrene-hydrogenated polybutadiene-polystyrene, a bonded styrene content of 47%, a number-average molecular weight of 83,000, a molecular weight distribution of 1.05, a 1,2-vinyl bond content of polybutadiene of 46% before hydrogenation, a hydrogenation rate of polybutadiene portion of 99.9%, and a Young's modulus of 3,700 Kg/cm$^2$ was prepared, and the resulting polymer was used as (c-2).

Similarly, a hydrogenated block copolymer having a structure of hydrogenated polybutadiene-polystyrene-hydrogenated polybutadiene-polystyrene, a bonded styrene content of 33%, a number-average molecular weight of 160,000, a molecular weight distribution of 1.09, a 1,2-vinyl bond content of polybutadiene of 53% before hydrogenation, a hydrogenation rate of polybutadiene portion of 99.9%, and a Young's modulus of 400 Kg/cm$^2$ was prepared, and the resulting polymer was used as (c-3).

Furthermore, a hydrogenated block copolymer having a structure of polystyrene-hydrogenated polybutadiene-polystyrene, a bonded styrene content of 60%, a number-average molecular weight of 103,000, a molecular weight distribution of 1.12, a 1,2-vinyl bond content of polybutadiene of 76% before hydrogenation, a hydrogenation rate of polybutadiene portion of 99.9%, and a Young's modulus of 4,500 Kg/cm$^2$ was prepared, and the resulting polymer was used as (c-4).

Moreover, a hydrogenated block copolymer having a structure of polystyrene-hydrogenated polybutadiene-polystyrene-hydrogenated polybutadiene, a bonded styrene content of 48%, a number-average molecular weight of 86,000, a molecular weight distribution of 1.07, a 1,2-vinyl bond content of polybutadiene of 68% before hydrogenation, a hydrogenation rate of polybutadiene portion of 99.9%, and a Young's modulus of 3,600 Kg/cm$^2$ was prepared, and the resulting polymer was used as (c-5).

Furthermore, a hydrogenated block copolymer having a structure of polystyrene-hydrogenated polybutadiene-polystyrene, a bonded styrene content of 35%, a number-average molecular weight of 157,000, a molecular weight distribution of 1.09, a 1,2-vinyl bond content of polybutadiene of 58% before hydrogenation, a hydrogenation rate of polybutadiene portion of 99.9%, and a Young's modulus of 500 Kg/cm$^2$ was prepared, and the resulting polymer was used as (c-6).

Then, a hydrogenated block copolymer having a structure of polystyrene-hydrogenated polybutadiene-polystyrene, a bonded styrene content of 61%, a number-average molecular weight of 46,000, a molecular weight distribution of 1.03, a 1,2-vinyl bond content of polybutadiene of 70% before hydrogenation, a hydrogenation rate of polybutadiene portion of 99.9%, and a Young's modulus of 4,300 Kg/cm$^2$ was prepared, and the resulting polymer was used as (c-7).

Moreover, Kraton G1651 (manufactured by Shell Chemical Co., Ltd.) was used as hydrogenated block copolymer (c-8).

Furthermore, a hydrogenated block copolymer having a structure of polystyrene-hydrogenated polybutadiene (1,2-vinyl bond content of polybutadiene before hydrogenation being 40%)—hydrogenated polybutadiene (1,2-vinyl bond content of polybutadiene before hydrogenation being 74%)—polystyrene, a bonded styrene content of 48%, a number-average molecular weight of 148,000, a molecular weight distribution of 1.07, a ratio of hydrogenated polybutadiene having a vinyl bond content of 40% before hydrogenation/hydrogenated polybutadiene having a vinyl bond content of 74% before hydrogenation=30/70 (weight ratio), a hydrogenation rate of polybutadiene portion of 99.9%, and a Young's modulus of 3,600 Kg/cm$^2$ was prepared, and the resulting polymer was used as (c-9).

Furthermore, a hydrogenated block copolymer having a structure of hydrogenated polybutadiene (1,2-vinyl bond content of polybutadiene before hydrogenation being 11%)—polystyrene-hydrogenated polybutadiene (1,2-vinyl bond content of polybutadiene before hydrogenation being 72%)—polystyrene, a bonded styrene content of 47%, a number-average molecular weight of 120,000, a molecular weight distribution of 1.05, a ratio of [hydrogenated polybutadiene having a vinyl bond content of 11% before hydrogenation]/[hydrogenated polybutadiene having a vinyl bond content of 72% before hydrogenation]=10/90 (weight ratio), a hydrogenation rate of polybutadiene portion of 99.9%, and a Young's modulus of 3,600 Kg/cm$^2$ was prepared, and the resulting polymer was used as (c-10).

Moreover, a hydrogenated block copolymer having a structure of hydrogenated polybutadiene (1,2-vinyl bond content of polybutadiene before hydrogenation being 10%)—hydrogenated polybutadiene (1,2-vinyl bond content of polybutadiene before hydrogenation being 73%)—polystyrene, a bonded styrene content of 47%, a number-average molecular weight of 88,000, a molecular weight distribution of 1.04, a ratio of [hydrogenated polybutadiene having a vinyl bond content of 11% before hydrogenation]/[hydrogenated polybutadiene having a vinyl bond content of 72% before hydrogenation]=10/90 (weight ratio), a hydrogenation rate of polybutadiene portion of 99.9%, and a Young's modulus of 3,600 Kg/cm$^2$ was prepared, and the resulting polymer was used as (c-11).

EXAMPLES 1–17 AND COMPARATIVE EXAMPLES 1–12

The components of high-crystalline polypropylene, medium-crystalline polypropylene, polyphenylene ether and hydrogenated block copolymer as shown in Tables 1–3 were fed into a twin-screw extruder (ZSK-40: manufactured by WERNER & PFLEIDERER Aktiengesellschaft, Germany) set at a temperature of 240–280° C. and a screw revolution speed of 500 rpm and having a first raw material feed opening and a second raw material feed opening (positioned at nearly the center of the extruder) in accordance with the composition of resins at the first raw material feed opening and the composition of resins at the second raw material feed opening as shown in Tables 1–3, and the resins were melt kneaded to obtain a resin composition as pellets. The pellets were fed to a screw in-line type injection molding machine set at 240–280° C., and test pieces for tensile test, those for the measurement of flexural modulus, those for Izod impact test, and those for the measurement of deflection temperature under load were obtained by injection molding under the condition of 60° C. in mold temperature. In order to confirm the resin structure (morphology) of the resulting resin composition, the state of dispersion phase of the test pieces for tensile test obtained above was photographed using a transmission type electron microscope (TEM) (a negative was photographed at ×5,000 and developed to ×10,000). Using the photographs, the minor diameter and the major diameter of dispersion particles dispersed in the matrix comprising polypropylene resin were measured and the results are shown in Tables 1–3.

Then, these test pieces were subjected to tensile strength test (ASTM D-638: 23° C.) to measure tensile strength and breaking extension. Furthermore, flexural modulus (ASTM D-790: 23° C.), Izod (notched) impact strength (ASTM D-256: 23° C.), and deflection temperature under load (ASTM D-648: 18.6 Kg/cm$^2$ load) were measured. Furthermore, a part of these test pieces were exposed to an environment of thermal history (80° C.×48 hours) using a Geer oven on the assumption of estimative thermal history. Then, similarly, they were subjected to tensile strength test (ASTM D-638: 23° C.) to measure tensile strength and breaking extension, and, furthermore, flexural modulus (ASTM D-790: 23° C.), Izod (notched) impact strength (ASTM D-256: 23° C.), and deflection temperature under load (ASTM D-648: 18.6 Kg/cm$^2$ load) were measured. The results are shown in Tables 1–3. Furthermore, the heat creep resistance of the resin composition was examined in the following manner. That is, a rod-shaped sample of 1 mm×1 mm×30 mm was subjected to heat creep resistance test using RHEOVIBRON DDV-01/25FP (manufactured by Orientek Co., Ltd., Japan) under the condition of a load corresponding to a stress of 150 Kg·f/cm$^2$ and a temperature of 65° C., and a time before the sample was broken was measured. The results are also shown in Tables 1–3. Furthermore, water vapor transmission resistance of the resin composition was examined in the following manner. That is, a sample of a sheet having a thickness of 0.5 mm was prepared, and a water vapor transmission rate [WVTR (g/m$^2$·24 hr)] was measured in accordance with ASTM F1249 under the conditions of a temperature of 38° C. and a relative humidity of 90% using a water vapor transmission rate-measuring apparatus PERMATRAN W-200 (manufactured by MOCON Co., Ltd., USA), and WVTR per 1 mm in thickness was obtained. The results are shown in Tables 1–3.

TABLE 1

| | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|
| Composition of resin at the first raw material feed opening (part by weight) | | | | | | | | | | | | |
| PP-1 | | | | | | | | | | | | |
| PP-2 | | | | | | | | | | | | |
| PP-3 | | | | | | | | | | | | |
| PP-4 | | | | | | | | | | | | |
| PP-5 | | | | | | | | | | | | |
| PP-6 | | | | | | | | | | | | |
| b-1 | | | | | | 40 | 30 | | | | | |
| b-2 | 40 | 40 | 40 | 40 | 40 | | | 40 | 35 | 40 | 40 | 40 |
| c-1 | | | | | | | | | | 3 | 3 | 3 |
| c-2 | 5 | 5 | 5 | 5 | 5 | | | | | | | |
| c-3 | | | | | | | | | | 4 | 4 | 4 |
| c-4 | | | | | | | 15 | | | | | |
| c-5 | | | | | | 10 | | | 8 | | | |
| c-6 | | | | | | | | 6 | | | | |
| c-7 | | | | | | | | | | | | |
| c-8 | | | | | | | | | | | | |
| Composition of resin at the second raw material feed opening (parts by weight) | | | | | | | | | | | | |
| PP-1 | 80 | 50 | 40 | 30 | | 60 | 70 | | | | | |

TABLE 1-continued

|  | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|
| PP-2 |  |  |  |  |  |  |  | 60 |  |  |  |  |
| PP-3 |  |  |  |  |  |  |  |  | 65 |  |  |  |
| PP-4 |  | 10 | 20 | 30 | 60 |  |  |  |  | 60 |  |  |
| PP-5 |  |  |  |  |  |  |  |  |  |  | 60 |  |
| PP-6 |  |  |  |  |  |  |  |  |  |  |  | 60 |
| b-1 |  |  |  |  |  |  |  |  |  |  |  |  |
| b-2 |  |  |  |  |  |  |  |  |  |  |  |  |
| c-1 |  |  |  |  |  |  |  |  |  | 3 | 3 | 3 |
| c-2 | 5 | 5 | 5 | 5 | 5 |  |  |  |  |  |  |  |
| c-3 |  |  |  |  |  |  |  |  |  |  |  |  |
| c-5 |  |  |  |  |  |  |  |  |  |  |  |  |
| c-6 |  |  |  |  |  |  |  |  |  |  |  |  |
| c-7 |  |  |  |  |  |  |  |  |  |  |  |  |
| c-8 |  |  |  |  |  |  |  |  |  |  |  |  |
| Properties |  |  |  |  |  |  |  |  |  |  |  |  |
| Properties after 23° C. × 24 hours |  |  |  |  |  |  |  |  |  |  |  |  |
| Tensile strength (Kg/cm$^2$) | 490 | 480 | 470 | 470 | 450 | 480 | 440 | 420 | 410 | 430 | 420 | 410 |
| Tensile elongation (%) | 150 | 300 | 320 | 350 | 390 | 190 | 140 | 100 | 90 | 330 | 260 | 240 |
| Flexural modulus (Kg/cm$^2$) | 16000 | 15700 | 15500 | 15000 | 14600 | 15700 | 16200 | 15200 | 15800 | 14800 | 15000 | 15000 |
| Izod impact strength (Kg · cm/cm) | 29 | 30 | 31 | 37 | 38 | 33 | 16 | 8 | 6 | 35 | 19 | 18 |
| Deflection temperature under boad (° C.) | 109 | 108 | 104 | 100 | 94 | 108 | 98 | 102 | 100 | 99 | 100 | 100 |
| Properties |  |  |  |  |  |  |  |  |  |  |  |  |
| Properties after 80° C. × 48 hours |  |  |  |  |  |  |  |  |  |  |  |  |
| Tensile strength (Kg/cm$^2$) | 490 | 480 | 480 | 480 | 460 | 480 | 450 | 420 | 410 | 440 | 410 | 410 |
| Tensile elongation (%) | 70 | 180 | 270 | 310 | 300 | 120 | 60 | 40 | 20 | 260 | 180 | 170 |
| Flexural modulus (Kg/cm$^2$) | 17000 | 17000 | 17000 | 16800 | 15800 | 17100 | 17100 | 16100 | 16800 | 16400 | 16500 | 16500 |
| Izod impact strength (Kg · cm/cm) | 38 | 38 | 36 | 39 | 41 | 44 | 20 | 9 | 8 | 36 | 19 | 18 |
| Deflection temperature under boad (° C.) | 116 | 116 | 115 | 114 | 104 | 114 | 104 | 106 | 104 | 109 | 108 | 108 |
| Minor diameter of dispersion particles (μm) | 0.7 | 0.7 | 0.7 | 0.7 | 0.7 | 0.08 | 0.1 | 0.3 | 0.07 | 1.8 | 1.2 | 1 |
| Ratio of major diameter/minor diameter of dispersion particles | 4 | 3.9 | 3.8 | 4 | 4.2 | 1.3 | 2.1 | 2.9 | 1.4 | 9.3 | 7.6 | 6.1 |
| Heat creep resistance (Hrs) | 100 or more | 100 or more | 100 or more | 100 or more | 100 or more | 100 or more | 40 | 20 | 100 or more | 90 | 50 |
| Water vapor transmission (g/m$^2$ · hrs) | 0.65 | 0.66 | 0.67 | 0.7 | 0.8 | 0.74 | 0.6 | 0.73 | 0.63 | 0.74 | 0.68 | 0.56 |

TABLE 2

|  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 |
|---|---|---|---|---|---|---|---|---|---|
| Composition of resin at the first raw material feed opening (part by weight) |  |  |  |  |  |  |  |  |  |
| PP-1 |  |  | 60 |  |  | 60 | 60 |  |  |
| PP-2 |  |  |  |  |  |  |  |  |  |
| PP-3 |  |  |  |  |  |  |  |  |  |
| PP-4 |  |  |  |  |  |  |  |  |  |
| PP-5 |  |  |  |  |  |  |  |  |  |
| PP-6 |  |  |  |  |  |  |  |  |  |
| b-1 |  |  |  | 40 | 40 | 40 |  | 30 |  |
| b-2 | 40 | 40 | 40 |  |  |  |  |  | 40 |
| c-1 |  |  |  |  |  |  |  |  |  |
| c-2 |  |  | 10 |  |  |  |  |  |  |
| c-3 |  |  |  |  |  |  |  |  |  |
| c-4 |  |  |  |  |  |  |  |  |  |
| c-5 |  |  |  |  | 5 | 10 |  |  |  |
| c-6 |  |  |  |  |  |  |  |  |  |
| c-7 |  |  |  |  |  |  |  | 15 |  |
| c-8 |  | 10 |  |  |  |  |  |  |  |

TABLE 2-continued

|  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 |
|---|---|---|---|---|---|---|---|---|---|
| Composition of resin at the second raw material feed opening (part by weight) | | | | | | | | | |
| PP-1 | 60 | 60 |  | 60 | 60 |  |  | 70 | 50 |
| PP-2 | | | | | | | | | |
| PP-3 | | | | | | | | | |
| PP-4 | | | | | | | | | |
| PP-5 | | | | | | | | | 10 |
| PP-6 | | | | | | | | | |
| b-1 | | | | | | | 40 | | |
| b-2 | | | | | | | | | |
| c-1 | | | | | | | | | |
| c-2 | 10 | | | | | | | | 10 |
| c-3 | | | | | | | | | |
| c-4 | | | | | | | | | |
| c-5 | | | | 10 | 5 |  | 10 | | |
| c-6 | | | | | | | | | |
| c-7 | | | | | | | | | |
| c-8 | | | | | | | | | |
| Properties | | | | | | | | | |
| Properties after 23° C. × 24 hours | | | | | | | | | |
| Tensile strength (Kg/cm$^2$) | 480 | 460 | 440 | 410 | 410 | 420 | 400 | 400 | 460 |
| Tensile elongation (%) | 140 | 160 | 110 | 210 | 200 | 200 | 190 | 110 | 270 |
| Flexural modulus (Kg/cm$^2$) | 15100 | 13900 | 15500 | 13300 | 13600 | 13500 | 13100 | 16000 | 15000 |
| Izod impact strength (Kg · cm/cm) | 31 | 35 | 33 | 35 | 33 | 34 | 31 | 15 | 31 |
| Deflection temperature under boad (° C.) | 100 | 100 | 99 | 81 | 83 | 82 | 79 | 93 | 98 |
| Properties | | | | | | | | | |
| Properties after 80° C. × 48 hours | | | | | | | | | |
| Tensile strength (Kg/cm$^2$) | 490 | 480 | 450 | 420 | 410 | 410 | 410 | 410 | 460 |
| Tensile elongation (%) | 60 | 70 | 50 | 100 | 110 | 100 | 100 | 50 | 180 |
| Flexural modulus (Kg/cm$^2$) | 16000 | 15800 | 16200 | 14600 | 14500 | 14400 | 14000 | 16800 | 16000 |
| Izod impact strength (Kg · cm/cm) | 37 | 36 | 35 | 35 | 34 | 33 | 33 | 16 | 33 |
| Deflection temperature under boad (° C.) | 106 | 104 | 108 | 93 | 94 | 91 | 92 | 101 | 107 |
| Minor diameter of dispersion particles (μm) | 1.3 | 2.8 | 2.2 | 1.4 | 0.9 | 1.2 | 2.4 | 2.3 | 1.4 |
| Ratio of major diameter/minor diameter of dispersion particles | 11.2 | 8.4 | 12.6 | 16.5 | 12.1 | 15.3 | 6.7 | 10.4 | 12.3 |
| Heat creep resistance (Hrs) | 6.5 | 4.3 | 3.7 | 0.9 | 1.1 | 0.7 | 0.3 | 7 | 6 |
| Water vapor transmission (g/m$^2$ · hrs) | 1.7 | 1.5 | 1.3 | 2 | 1.8 | 19 | 2.1 | 0.9 | 1.6 |

TABLE 3

|  | Example 13 | Example 14 | Example 15 | Example 16 | Example 17 | Comp. Ex. 10 | Comp. Ex. 11 | Comp. Ex. 12 |
|---|---|---|---|---|---|---|---|---|
| Composition of resin at the first raw material feed opening (part by weight) | | | | | | | | |
| PP-1 | | | | | | | 43 | |
| PP-2 | | | | | | | | |
| PP-3 | | | | | | | | |
| PP-4 | | 20 | | 22 | 22 | | 22 | 22 |
| PP-5 | | | | | | | | |
| PP-6 | | | | | | | | |
| b-1 | 40 | 40 | | | | 40 | | |
| b-2 | | | 35 | 35 | 35 | | 35 | 35 |
| c-9 | 10 | 10 | | | | 5 | | |
| c-10 | | | 7 | 7 | | | 7 | |
| c-11 | | | | | 7 | | | 3 |

TABLE 3-continued

|  | Example 13 | Example 14 | Example 15 | Example 16 | Example 17 | Comp. Ex. 10 | Comp. Ex. 11 | Comp. Ex. 12 |
|---|---|---|---|---|---|---|---|---|
| Composition of resin at the second raw material feed opening (part by weight) | | | | | | | | |
| PP-1 | 40 | 40 | 43 | 43 | 43 | 40 |  | 43 |
| PP-2 | | | | | | | | |
| PP-3 | | | | | | | | |
| PP-4 | 20 |  | 22 |  |  | 20 | | |
| PP-5 | | | | | | | | |
| PP-6 | | | | | | | | |
| b-1 | | | | | | | | |
| b-2 | | | | | | | | |
| c-9 | | | | | | 5 | | |
| c-10 | | | | | | | | |
| c-11 | | | | | | | | 4 |
| Properties | | | | | | | | |
| Properties after 23° C. × 24 hours | | | | | | | | |
| Tensile strength (Kg/cm$^2$) | 480 | 480 | 420 | 420 | 400 | 420 | 400 | 400 |
| Tensile elongation (%) | 330 | 310 | 270 | 260 | 100 | 320 | 220 | 120 |
| Flexural modulus (Kg/cm$^2$) | 15100 | 15000 | 16100 | 15900 | 16000 | 13800 | 13300 | 13500 |
| Izod impact strength (Kg · cm/cm) | 36 | 29 | 34 | 21 | 11 | 35 | 30 | 9 |
| Deflection temperature under boad (° C.) | 102 | 104 | 101 | 100 | 100 | 91 | 79 | 84 |
| Properties | | | | | | | | |
| Properties after 80° C. × 48 hours | | | | | | | | |
| Tensile strength (Kg/cm$^2$) | 480 | 480 | 440 | 430 | 410 | 420 | 400 | 400 |
| Tensile elongation (%) | 310 | 310 | 210 | 250 | 80 | 270 | 160 | 70 |
| Flexural modulus (Kg/cm$^2$) | 17000 | 17000 | 16900 | 16800 | 16500 | 14400 | 14000 | 14100 |
| Izod impact strength (Kg · cm/cm) | 40 | 33 | 35 | 29 | 13 | 35 | 31 | 10 |
| Deflection temperature under boad (° C.) | 115 | 114 | 108 | 108 | 104 | 100 | 88 | 92 |
| Minor diameter of dispersion particles (μm) | 0.2 | 0.1 | 0.15 | 0.12 | 0.2 | 1.4 | 1.3 | 1.5 |
| Ratio of major diameter/minor diameter of dispersion particles | 1.9 | 1.6 | 1.6 | 1.6 | 2.1 | 13.1 | 15.4 | 12.5 |
| Heat creep resistance (Hrs) | 100 or more | 100 or more | 100 or more | 100 or more | 30 | 0.9 | 0.4 | 0.7 |
| Water vapor transmission (g/m$^2$ · hrs) | 0.66 | 0.52 | 0.62 | 0.49 | 0.51 | 2.1 | 16 | 1.7 |

From the results, the following can be seen.

① The resin compositions of the present invention in which the minor diameter of the dispersion particles comprising a polyphenylene ether resin and a hydrogenated block copolymer is 2 μm or less, and the ratio of major diameter/minor diameter is 1–10 give resin molded articles excellent in heat creep resistance and water vapor transmission resistance.

② Even if the resin compositions comprise the same components, when the processes of production thereof differ, resin compositions in which the ratio of major diameter/minor diameter is not 1–10 are obtained even when the minor diameter of the dispersion particles comprising a polyphenylene ether resin and a hydrogenated block copolymer is 2 μm or less, and the resulting resin compositions are inferior in heat creep resistance and water vapor transmission resistance.

③ Especially, in the case of using hydrogenated block copolymers having similar bonded styrene contents, when hydrogenated block copolymer of 55% or less in vinyl bond content in conjugated diene compound before hydrogenation is divided and fed separately from the first raw material feed opening and the second raw material feed opening at the time of preparation of the composition, the minor diameter of the dispersion particles comprising a polyphenylene ether resin and a hydrogenated block copolymer in the resin composition is 2 μm or less, and the ratio of major diameter/minor diameter is 1–10, and resin molded articles excellent in heat creep resistance, water vapor transmission resistance, heat resistance (DTUL) and rigidity (flexural modulus) are obtained.

On the other hand, when hydrogenated block copolymer of more than 55% in vinyl bond content in conjugated diene compound before hydrogenation is divided and fed from the first raw material feed opening and the second raw material feed opening or is totally fed from the second raw material feed opening at the time of preparation of the composition, the minor diameter of the dispersion particles comprising a polyphenylene ether resin and a hydrogenated block copolymer in the resin composition exceeds 2 μm, or even if it is 2 μm or less, the ratio of major diameter/minor diameter exceeds 10, and heat creep resistance, water vapor transmission resistance, heat resistance (DTUL) and rigidity (flexural modulus) are deteriorated.

④ The resin compositions of the present invention in which the polypropylene resin contains a specific high-crystalline polypropylene resin and a specific medium-crystalline polypropylene resin at a specific ratio and the minor diameter of the dispersion particles comprising a polyphenylene ether resin and a hydrogenated block copolymer is 2 μm or less, and the ratio of major diameter/minor diameter is 1–10 give resin molded articles which keep heat creep resistance, water vapor transmission resistance and tenacity (elongation) after thermal history (80° C.×48 hr) at high levels.

⑤ If number-average molecular weight of polymer block A mainly composed of a vinyl aromatic compound of the hydrogenated block copolymer used as a compatibility agent for polypropylene resin and polyphenylene ether resin is less than 15,000, the resin composition cannot satisfy the conditions of the minor diameter of the dispersion particles comprising a polyphenylene ether resin and a hydrogenated block copolymer being 2 μm or less and the ratio of major diameter/minor diameter being 1–10 and is low in heat creep resistance, impact resistance and heat resistance (DTUL).

⑥ With regard to water vapor transmission resistance, the resin compositions of the present invention which satisfy the conditions of the minor diameter of the dispersion particles comprising a polyphenylene ether resin and a hydrogenated block copolymer being 2 μm or less and the ratio of major diameter/minor diameter being 1–10 give resin molded articles less in water vapor transmission rate per 1 mm in thickness as compared with those which do not satisfy the above conditions, even if they comprise the same components.

Therefore, the resin compositions of the present invention keep at a high level the balance of properties of heat creep resistance, tenacity (elongation) after thermal history (80° C.×48 hr) and water vapor transmission resistance. Moreover, when a high-crystalline polypropylene and a medium-crystalline polypropylene are used in combination as the polypropylene resin, a higher synergistic effect can be obtained.

EXAMPLE 18

Figure 2:
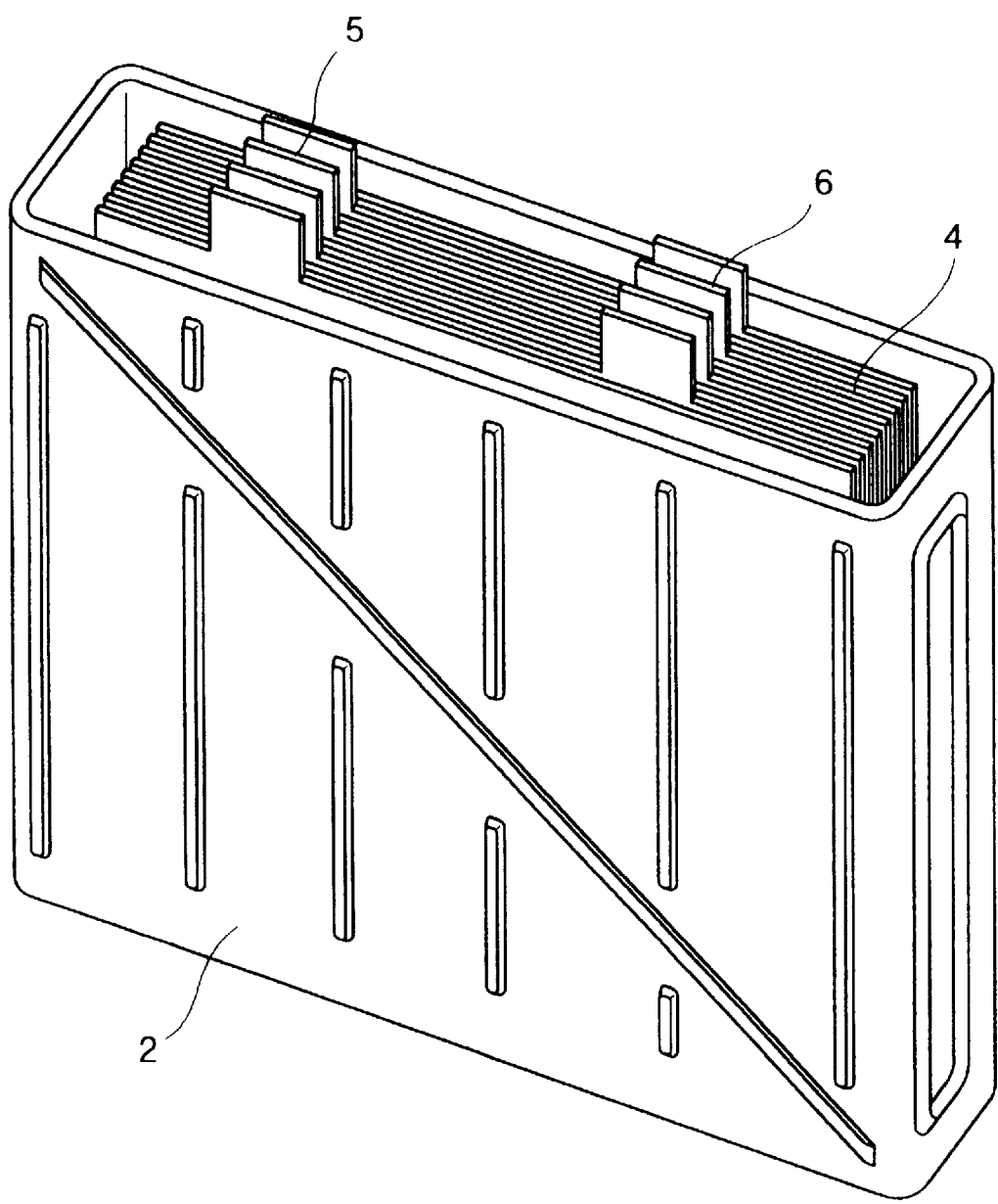
FIG. 2 is an oblique view which shows the state of separators (electrode group) containing an electrolyte being put in a container (battery case).
Figure 3:
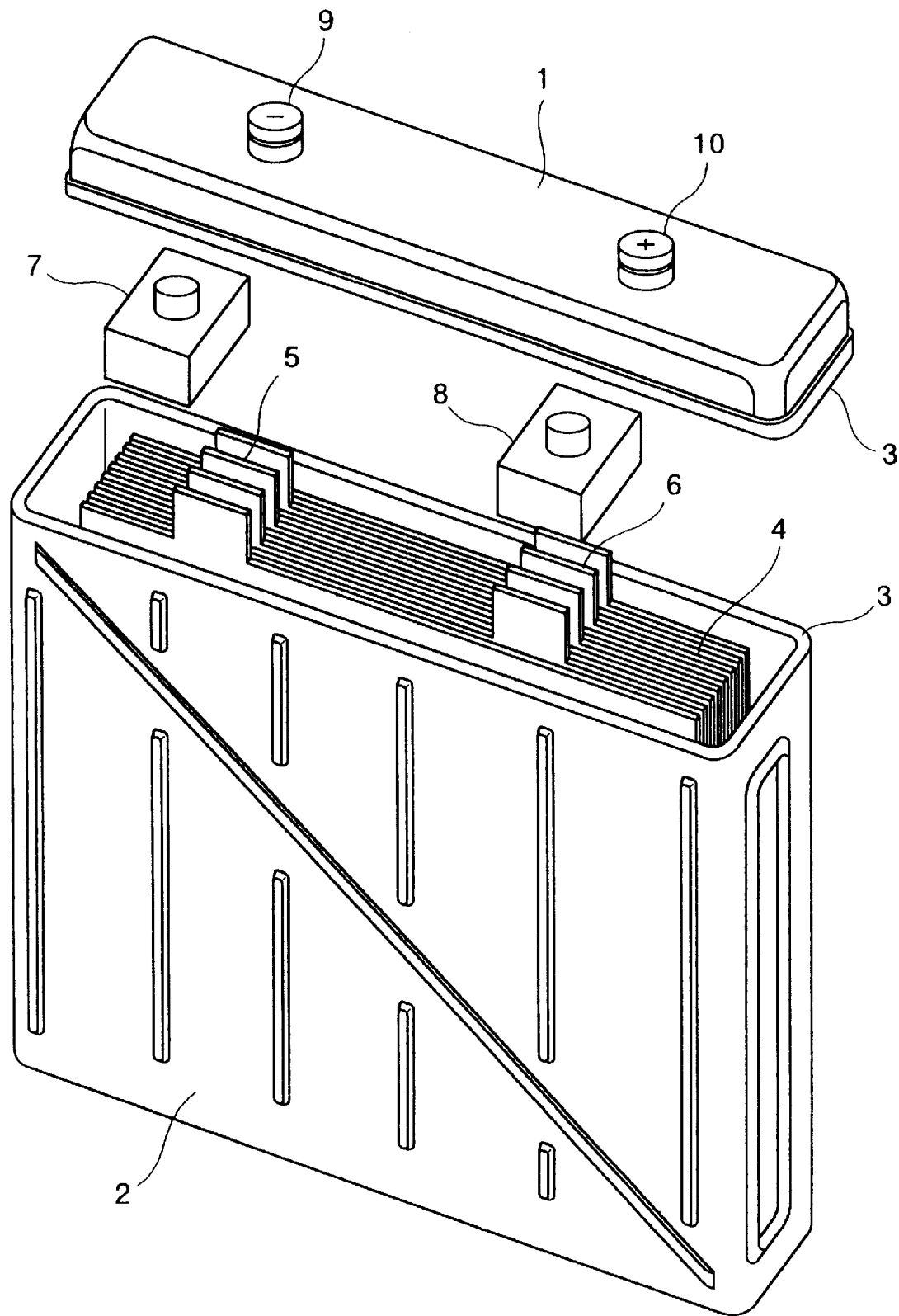
FIG. 3 shows all the parts which constitute a secondary battery and is an oblique view of a container (battery case) which contains separators (electrode group) containing an electrolyte as shown in FIG. 2 and a container cover (battery case cover).

A container of secondary battery was made by injection molding the resin composition of the present invention. FIG. 1 is an oblique view of secondary battery container (battery case) 2. A plurality of ribs 11, 12 and 13 were formed on the outer surface of this container 2. Separators (electrode group) 4 containing an electrolyte were placed in the container 2, and from each of these electrodes were protruded negative electrode lead portions 5 and positive electrode lead portions 6 (FIG. 2). The top ends of negative electrode lead portions 5 and positive electrode lead portions 6 were covered with negative electrode collector 7 and positive electrode collector 8. Upper parts 3 of the container 2 were heat fusion bonded together with container cap (cap of battery case) 1 provided with negative electrode terminal 9 and positive electrode terminal 10, thereby sealing the container.

What is claimed is:

1. A resin composition comprising a polypropylene resin, a polyphenylene ether resin and a compatibility agent wherein dispersion particles comprising the polyphenylene ether resin are dispersed in a matrix comprising the polypropylene resin, a minor diameter of the dispersion particles is 2 μm or less, and the ratio of major diameter/minor diameter of the dispersion particles is 1–10.

2. A resin composition according to claim 1, wherein the minor diameter of the dispersion particles is 1 μm or less and the ratio of major diameter/minor diameter is 1–3.

3. A resin composition according to claim 1, wherein the compatibility agent is a hydrogenated block copolymer.

4. A resin composition according to claim 3 which comprises (a) 37–94% by weight the polypropylene resin, (b) 4–54% by weight of the polyphenylene ether resin and (c) 1–20% by weight of the hydrogenated block copolymer.

5. A resin composition according to claim 1, wherein the polypropylene resin comprises two kinds of polypropylene resins having different properties of (a-1) a high-crystalline polypropylene resin having a proportion of crystalline phase in propylene homopolymer portion of 96% or higher obtained from free induction damping (FID) by pulse NMR and having a melting point of 163° C. or higher and (a-2) a medium-crystalline polypropylene resin having a proportion of crystalline phase in propylene homopolymer portion of 93% or higher and less than 96% obtained from free induction damping (FID) by pulse NMR and having a melting point of 155° C. or higher and lower than 163° C., the ratio of the high-crystalline polypropylene resin/the medium-crystalline polypropylene resin being 95/5–10/90 (weight ratio).

6. A resin composition according to claim 3, wherein the hydrogenated block copolymer is obtained by hydrogenating a block copolymer which comprises at least one polymer block B mainly composed of a conjugated diene compound having a vinyl bond content of 30–95% before hydrogenation and at least one polymer block A mainly composed of a vinyl aromatic compound.

7. A resin composition according to claim 6, wherein the vinyl bond content before hydrogenation is 30–55%.

8. A resin composition according to claim 6, wherein the vinyl bond content before hydrogenation is more than 55% and 95% or less.

9. A resin composition according to claim 6, wherein the polymer block B comprises at least one polymer block B mainly composed of a conjugated diene compound having a vinyl bond content before hydrogenation of more than 55% and 95% or less and additionally at least one polymer block B mainly composed of a conjugated diene compound having a vinyl bond content before hydrogenation of 30–55%, and the ratio of [polymer block mainly composed of a conjugated diene compound having a vinyl bond content of more than 55% and 95% or less]/[polymer block mainly composed of a conjugated diene compound having a vinyl bond content of 30–55%] is 97/3–3/97 (weight ratio).

10. A resin composition according to claim 3, wherein the hydrogenated block copolymer is obtained by hydrogenating a block copolymer which comprises at least one polymer block B mainly composed of a conjugated diene compound having a vinyl bond content before hydrogenation of 30–95% and at least one polymer block B' mainly composed of a conjugated diene compound having a vinyl bond content before hydrogenation of 5% or more and less than 30, and additionally at least one polymer block A mainly composed of a vinyl aromatic compound, the ratio of the polymer blocks B and B' being B/B'=97/3–50/50 (weight ratio).

11. A resin composition according to claim 3, wherein the polymer block A has a number-average molecular weight of 15,000 or more.

12. A resin composition according to claim 3, wherein the hydrogenated block copolymer has a Young's modulus of 250–7,000 Kg/cm².

13. A resin composition according to claim 1 which has at least one melting point of crystalline phase at 65° C. or higher.

14. A resin composition according to claim 1 which has a deflection temperature under load (DTUL: under a load of 18.6 Kg/cm2) of 70–150° C. based on ASTM-D648.

15. A resin composition according to claim 1 which is used for a container of secondary battery.

16. A resin composition according to claim 3, wherein the dispersion particles comprise the polyphenylene ether resin and the hydrogenated block copolymer.

* * * * *